United States Patent [19]

Parker et al.

[11] Patent Number: 5,895,738
[45] Date of Patent: Apr. 20, 1999

[54] EXTENSION OF XEROCOLORGRAPHY TO FULL COLOR PRINTING EMPLOYING ADDITIVE RGB+ K COLORS

[75] Inventors: Delmer G. Parker, Rochester, N.Y.; Gregory J. Kovacs, Mississauga, Canada

[73] Assignee: Xerox Corporation, Stamford, Conn.

[21] Appl. No.: 08/916,461

[22] Filed: Aug. 22, 1997

[51] Int. Cl.$^6$ ............................................. G03G 13/01
[52] U.S. Cl. .................... 430/42; 430/54; 399/156; 399/223
[58] Field of Search .................. 430/42, 54; 399/223, 399/156

[56] References Cited

U.S. PATENT DOCUMENTS

| | | | |
|---|---|---|---|
| 4,731,634 | 3/1988 | Stark | 355/3 TR |
| 4,868,611 | 9/1989 | Germain | 355/328 |
| 5,049,949 | 9/1991 | Parker et al. | 355/328 |
| 5,155,541 | 10/1992 | Loce et al. | 355/328 |
| 5,221,954 | 6/1993 | Harris | 355/327 |
| 5,223,906 | 6/1993 | Harris | 355/326 |
| 5,337,136 | 8/1994 | Knapp et al. | 355/326 R |
| 5,347,303 | 9/1994 | Kovacs et al. | 346/157 |
| 5,373,313 | 12/1994 | Kovacs | 346/157 |
| 5,444,463 | 8/1995 | Kovacs et al. | 347/118 |
| 5,452,074 | 9/1995 | VonHoene et al. | 430/42 |
| 5,534,990 | 7/1996 | Harris | 355/327 |
| 5,565,974 | 10/1996 | Harris | 355/326 R |
| 5,592,281 | 1/1997 | Parker et al. | 399/156 |
| 5,716,744 | 2/1998 | Yergenson | 430/42 |

*Primary Examiner*—Christopher D. RoDee

[57] ABSTRACT

An imaging system is provided which combines the perfect registration capabilities of xerocolography to form perfectly registered red, green and blue images in a single pass in one mode of operation. In another mode of operation, the color gamut possible with RGB toners is extended using black toner to develop an image that is formed using a second imager or exposure device. The result is an extended gamut color imaging process using four colors side by side in a single pass with a minimum amount of color desaturation and with a minimum number of image registrations. Yet another mode of operation provides for creating K+2 colors in a single pass. The three or two colors may be used to form highlight colors and/or logo colors.

8 Claims, 8 Drawing Sheets

FIG. 5

| PROCESS STEPS | UNEXPOSED COLOR & VOLTAGE (AFTER PROCESS STEPS) | EXPOSED AT 670 NM COLOR & VOLTAGE (AFTER PROCESS STEPS) | EXPOSED AT 830 NM COLOR & VOLTAGE (AFTER PROCESS STEPS) | EXPOSED AT BOTH 670 AND 830 NM COLOR & VOLTAGE (AFTER PROCESS STEPS) |
|---|---|---|---|---|
| 1. EXPOSURE | 800 | | 400 | 0 |
| 2. CAD DEVELOP B | B, 500 | 400 | 400 | 0 |
| 3. DAD DEVELOP G | B, 500 | 400 | 400 | G, 300 |
| 4. RECHARGE TO BACKGROUND V | B, 400 | 400 | 400 | G, 400 |
| 5. BLANKET EXPOSE WITH RED LIGHT | B, 400 | 400 | 0 | G, 400 |
| 6. DAD DEVELOP R | B, 400 | 400 (WHITE) | R, 300 | G, 400 |
| 7. RECHARGE TO Vo/2 | 400 | 400 | R, 400 | G, 400 |
| 8. IMAGEWISE EXPOSE WITH IR LIGHT IN WHITE NONDEVELOPED AREA | 400 | 400 | 0 | R, 400 | G, 400 |
| 9. DAD DEVELOP K | B, 400 | 400 (WHITE) | K, 300 | R, 400 | G, 400 |

VOLTAGE
800 — CAD BIAS LEVEL
500
400 — DAD BIAS LEVEL
300
0

EXTENSION OF XEROCOLORGRAPHY TO FULL COLOR PRINTING EMPLOYING ADDITIVE RGB+ K COLORS

BACKGROUND OF THE INVENTION

This invention relates to a full color, xerographic printing system using a Raster Output Scanning (ROS) system incorporating a two wavelength ($\lambda$) laser diode source for the ROS and a charge retentive surface in the form of a belt or drum structure which is responsive to the two wavelengths and, more particularly, a red, green, and blue (RGB) plus black (K) imaging system which minimizes image desaturation and which can be selectively utilized for creating perfectly registered RGB process color images or extended gamut process color using black toner in combination with the RGB colors or K+2 (black+2 colors) color images where the colors may comprise highlight and/or logo colors.

Additive p color imaging using RGB color toners requires exact registration of images. Misregistered images or image overlap of RGB color toners results in a dirty brown color which desaturates the colors. This is because RGB colors each absorb two thirds of the visible spectrum resulting in undesirable browns when overlap occurs. In contrast, cyan, magenta, and yellow (CMY) colors absorb only a third of the visible spectrum. Overlaps lead to RGB colors.

Xerocolography (dry color printing) is a color printing architecture which combines multi-color xerographic development with multiwavelength laser diode light sources, with a single polygon, single optics ROS and with apolychromatic, multilayered photoreceptor to provide color printing in either a single pass or in two passes. In a single pass imaging machine, an image is formed by passing portion of the image receiving member past the processing stations only once. Inherently perfect registration is achieved since the various color images are all written at the same imaging station with the same ROS. In all, three perfectly registered latent images are written in this manner. Two of the three images are immediately developable because their voltage levels are offset from a background level while the voltage level of the third image is at the time of its creation equal to the background voltage level. An electrostatically distinguishable third image is formed when the photoreceptor is exposed to flood illumination of a predetermined wavelength.

It is desirable to provide as many features in a single imaging apparatus as possible. One is to create perfectly registered process color images using the additive primary colors red, green and blue. It is also desirable to be able to achieve the full gamut of the RGB images with a minimum of desaturation, and to extend the gamut further with black or other colors. Another desirable feature is being able to create K+2 colors where the colors are highlight colors and/or logo colors.

Following is a discussion of prior art, incorporated herein by reference, which may bear on the patentability of the present invention. In addition to possibly having some relevance to the question of patentability, these references, together with the detailed description to follow, are intended to provide a better understanding and appreciation of the present invention.

U.S. Pat. No. 4,731,634 entitled "Apparatus for printing black and plural highlight color images in a single pass" granted to Howard M. Stark on Mar. 15, 1988 discloses a method and apparatus for rendering latent electrostatic images visible using multiple colors of dry toner or developer and more particularly to printing toner images in black and at least two highlighting colors in a single pass of the imaging surface through the processing areas of the printing apparatus. Two of the toners are attracted to only one charge level on a charge retentive surface to thereby providing black and one highlight color while two toners are attracted to another charge level to form the second highlight color.

U.S. Pat. No. 4,868,611 entitled "Tri-Level Xerography Scorotron Neutralization Concept" granted to Richard P. Germain on Sep. 19, 1989 discloses the use of a scorotron after the development of a first image. The scorotron serves to bring that first image to complete charge neutralization which removes the voltage responsible for the fringe fields thereby precluding fringe field development during the development of a subsequent image.

U.S. Pat. No. 5,049,949 entitled "Extension of tri-level xerography to black plus 2 colors" granted to Parker et al on Sep. 17, 1991 discloses a highlight color printing apparatus and method for forming one black and two color images. A tri-level image containing CAD (charged area development) and DAD (discharged area development) image areas and a background area is formed. A second DAD image is formed by discharging the background area forming part of the tri-level image.

U.S. Pat. No. 5,155,541 entitled "Single pass digital printer with black, white and 2-color capability" granted to Robert P. Loce et al on Oct. 13, 1992 discloses a method and apparatus for printing toner images in black and at least two highlighting colors in a single pass of the imaging surface through the processing areas of the printing apparatus. Imaging and development techniques of color photography and tri-level xerography are combined to produce images with black and two colors wherein the two highlighting colors are developed with only one color toner. A single imaging step forms a four level charge pattern on a charge retentive surface followed by development of two of the image levels using tri-level imaging techniques. Uniform exposure of the imaging surface, similar to that used in color photography techniques precedes development of the last image. The uniform exposure modifies the last developed image level and the background charge level allowing development of the last image with a single toner.

U.S. Pat. No. 5,221,954 entitled "Single pass full color printing system using a quad-level xerographic unit" granted to Ellis D. Harris on Jun. 22, 1993 discloses a four color toner single pass color printing system consisting generally of a raster output scanner (ROS) optical system and a quad-level xerographic unit and a tri-level xerographic unit in tandem. The resulting color printing system would be able to produce pixels of black and white and all six primary colors. The color printing system uses a black toner and toners of the three subtractive primary colors or just toners of the three subtractive primary colors.

U.S. Pat. No. 5,223,906 entitled "Four color toner single pass color printing system using two tri-level xerographic units" granted to Ellis D. Harris on Jun. 29, 1993 discloses a four color toner single pass color printing system consisting generally of a raster output scanner (ROS) optical system and two tri-level xerographic units in tandem. Only two of the three subtractive primary colors of cyan, magenta and yellow are available for toner dot upon toner dot to combine to produce the additive primary colors. The resulting color printing system would be able to produce pixels of black and white and five of the six primary colors, with pixel next to pixel printing producing all but the strongest saturation of the sixth primary color, an additive primary color.

The color printing system uses either four color toners or a black toner and three color toners.

U.S. Pat. No. 5,534,990 entitled "Full color printing system using a penta-level xerographic unit" granted on Jul. 9, 1996 to Ellis D. Harris discloses a single pass full color printing system consisting generally of a raster output scanner (ROS) optical system and a quad-level xerographic unit and a penta-level xerographic unit in tandem. This full color printing system produces pixels of black and white and all six primary colors without toner upon toner.

U.S. Pat. No. 5,337,136 entitled "Tandem Tri-level Process Color Printer" granted to John F. Knapp et al on Aug. 9, 1994 discloses a tandem tri-level architecture. Three tri-level engines are arranged in a tandem configuration. Each engine uses one of the three primary colors plus one other color. Spot by spot, two color tri-level images can be created by each of the engines. The spot by spot images are transferred to an intermediate belt member, either in a spot on spot manner for forming full color images or in a spot next to spot manner to form highlight and/or logo color images. The images created by the tri-level engines can also be transferred to the intermediate in a manner such that both spot next to spot and spot on spot transfer is effected.

U.S. Pat. No. 5,347,303 entitled "Full Color Xerographic Printing System With Dual Wavelength, Single Optical System ROS And Dual Layer Photoreceptor" granted on Sep. 13, 1994 to Kovacs et al discloses a full color xerographic printing system, either two pass or single pass, with a single polygon, single optical system Raster Output Scanning (ROS) system which has a dual wavelength laser diode source for the ROS which images the dual beams at a single station as closely spaced spots or at two stations as closely spaced spots on a dual layer photoreceptor with each photoreceptor layer sensitive to or accessible by only one of the two wavelengths.

U.S. Pat. No. 5,373,313 entitled "Color xerographic printing system with multiple wavelength, single optical system ROS and multiple layer photoreceptor" granted to Gregory J. Kovacs on Dec. 13, 1994 discloses single pass color xerographic printing system with a single polygon, a single optical system Raster Output Scanning (ROS) system which has a multiple wavelength laser diode source for the ROS which images the multiple beams at a single station as closely spaced spots on a multiple layer photoreceptor with each photoreceptor layer sensitive to or accessible to only one of the multiple wavelengths.

U.S. Pat. No. 5,444,463 entitled "Color xerographic printing system with dual wavelength, single optical system ROS and dual layer photoreceptor" granted to Kovacs et al on Aug. 22, 1995 discloses a single pass color xerographic printing system with a single polygon, single optical system Raster Output Scanning (ROS) system which has a dual wavelength laser diode source for the ROS which images the dual beams at a single station as closely spaced spots on a dual layer photoreceptor with each photoreceptor layer sensitive to or accessible by only one of the two wavelengths.

U.S. Pat. No. 5,565,974 entitled "Penta-level xerographic unit" granted to Ellis D. Harris on Oct. 15, 1996 discloses a penta-level xerographic unit which produces five exposure levels on a photoreceptor. The five exposure levels select between a subtractive and an adjacent additive primary color in both the CAD and DAD operational regimes of a xerographic process. Exposure levels intermediate between the CAD and the DAD result in white. The selection of two possible colors in CAD, or two possible colors in DAD, or the selection of no toner yields a possibility of five colors. This penta-level xerographic unit can be used for a K+3 reduced color gamut printer, typically cyan, yellow and red plus black.

U.S. Pat. No. 5,592,281 entitled "Development scheme for three color highlight color trilevel xerography" granted to Parker et al on Jan. 7, 1997 discloses the creation of multiple color images in a single pass utilizing a multilayered photoreceptor structure having layers which are responsive to different wavelength lasers. A composite image including three images areas is formed with substantially perfect registration. A CAD and DAD image are developed using CMB (conductive magnetic brush) development and a second DAD image is developed using a non-interactive development system. Development of the second DAD image without developing halos around the CAD image is accomplished by uniformly recharging the photoreceptor to the background potential prior to the formation and development of the second DAD image.

BRIEF DESCRIPTION OF THE INVENTION

In accordance with the present invention, an imaging system is provided which combines the perfect registration capabilities of xerocolography to form perfectly registered red, green and blue images in a single pass in one mode of operation.

In another mode of operation, the color gamut possible using RGB toners is extended using black or another color toner to develop an image that is formed using a second imager or exposure device. The result is an extended gamut color imaging process using four colors side by side in a single pass with a minimum amount of color desaturation and with a minimum number of image registrations.

Yet another mode of operation provides for creating K+2 colors in a single pass. The two colors may be used to form highlight colors and/or logo colors.

The various modes of operation are made possible because some of the imaging components are selectively actuatable via a user interface.

The three perfectly registered images are developed using the additive primary colors RGB to create color images. Extended gamut RGBK composite images are made possible by creating the black component using a second exposure and development step. This can be done in a single pass using a second exposure station or in two pass imaging with only one exposure station. The K+RGB combination gives a desirable color gamut and the single pass process gives high throughput. The color gamut provided by the disclosed imaging system is similar to the color gamut available on an RGB type CRT (cathode ray tube) display. The perfect registration inherent in 3 color, 2 wavelength xerocolography is somewhat compromised by the introduction of the second imager but the additional black image capability and resulting broader color gamut outweigh this disadvantage in many applications.

BRIEF DESCRIPTION OF THE DRAWINGS

FIG. 5 depicts color development steps using a two color or two layer photoreceptor and RGB pigments together with an additional step of creating a black image.

DETAILED DESCRIPTION OF THE PREFERRED EMBODIMENT(S) OF THE INVENTION

Figure 8:
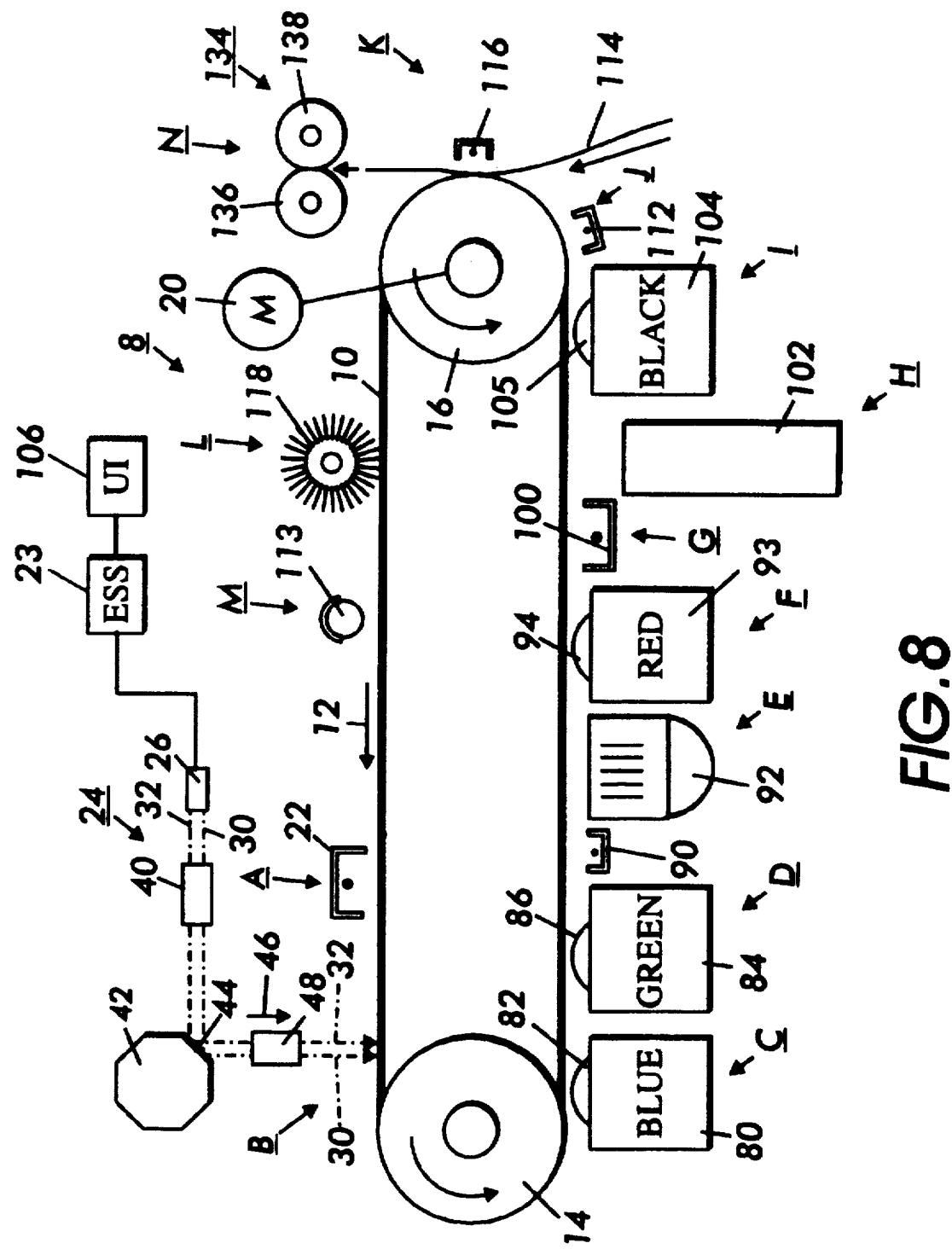
FIG. 8 is a schematic illustration of the imaging process according to the invention.

As shown in FIG. 8, xerocolography engine 8 comprises a charge retentive member in the form of a photoconductive belt structure 10 comprising a photoconductive surface and an electrically conductive substrate. The belt 10 is mounted for movement past a charging station A, a first image exposure station B, a first development station C, a second development station D, a recharge station 90, a flood illumination station E, a third development station F, a second recharge station G, a second exposure station H, a fourth development station I, a pretransfer charging station J and a transfer station K.

Belt 10 moves in the direction of arrow 12 to advance successive portions thereof sequentially through various processing stations disposed about the path of movement thereof. Belt 10 is entrained about a plurality of rollers 14 and 16. The roller 16 may be used as a drive roller and the roller 14 may be used to provide suitable tensioning of the photoreceptor belt 10. Motor 20 rotates roller 16 to advance belt 10 in the direction of arrow 12. Roller 16 is coupled to motor 20 by suitable means, not shown.

As can be seen by further reference to FIG. 8, initially successive portions of belt 10 pass through charging station A. At charging station A, a corona discharge device such as a scorotron, corotron or dicorotron indicated generally by the reference numeral 22, charges the belt 10 to a selectively high uniform positive or negative potential.

Next, the uniformly charged portions of the photoreceptor surface are advanced through exposure station B. At exposure station B, the uniformly charged photoreceptor or charge retentive surface 10 is exposed to a laser based Raster Output Scanning (ROS) device 24 which effects selective discharge of the photoreceptor belt structure 10. Any suitable control such as an Electronic SubSystem (ESS) 23, well known in the art, may be employed for controlling the ROS modulation device 24 as well as controlling the functions of the engine 8.

The ROS 24 can use a dual wavelength hybrid or monolithically integrated laser semiconductor structure 26 consisting of a red, e.g. 670 nm. wavelength laser emitter such as a semiconductor structure of AlGaInP/GaAs and an infrared, e.g. 830 nm. laser emitter such as a semiconductor structure of AlGaAs/GaAs, both laser emitter structures being known to those of ordinary skill in the art.

The different wavelength beams 30 and 32 are scanned sequentially over each other on the photoreceptor to yield excellent registration . The tangential offset of the laser sources is given an upper limit of 300 µm since tangential offset does not introduce scan line bow. The effect of tangential offset is to require delay in the electronic modulation signals to one of the dual beams relative to the other since one beam lags the other during scanning across the photoreceptor. Sagittal offset can also be used so that the beams are simultaneously scanning adjacent lines. On each successive scan, the line previously scanned by the forward beam is overscanned by the trailing beam. Appropriate image processing algorithms produce the desired image. The dual wavelength laser structure provides a substantially common spatial origin for each beam. Each beam is independently modulated so that it exposes the photoreceptor structure in accordance with a respective color image.

The two laser beams 30 and 32 emitted from the laser structure 26 are directed to a conventional beam input optical system 40 which collimates, conditions and focuses the beams onto optical paths such that they impinge on a rotating polygon mirror 42 having a plurality of facets 44. As the polygon mirror rotates, the facets cause the reflected beams to deflect repeatedly in the direction indicated by the arrow 46. The deflected laser beams are input to a single set of imaging and correction optics 48, which corrects for errors such as polygon angle error and wobble and focuses the beams onto the photoreceptor belt structure 10.

Figure 1:
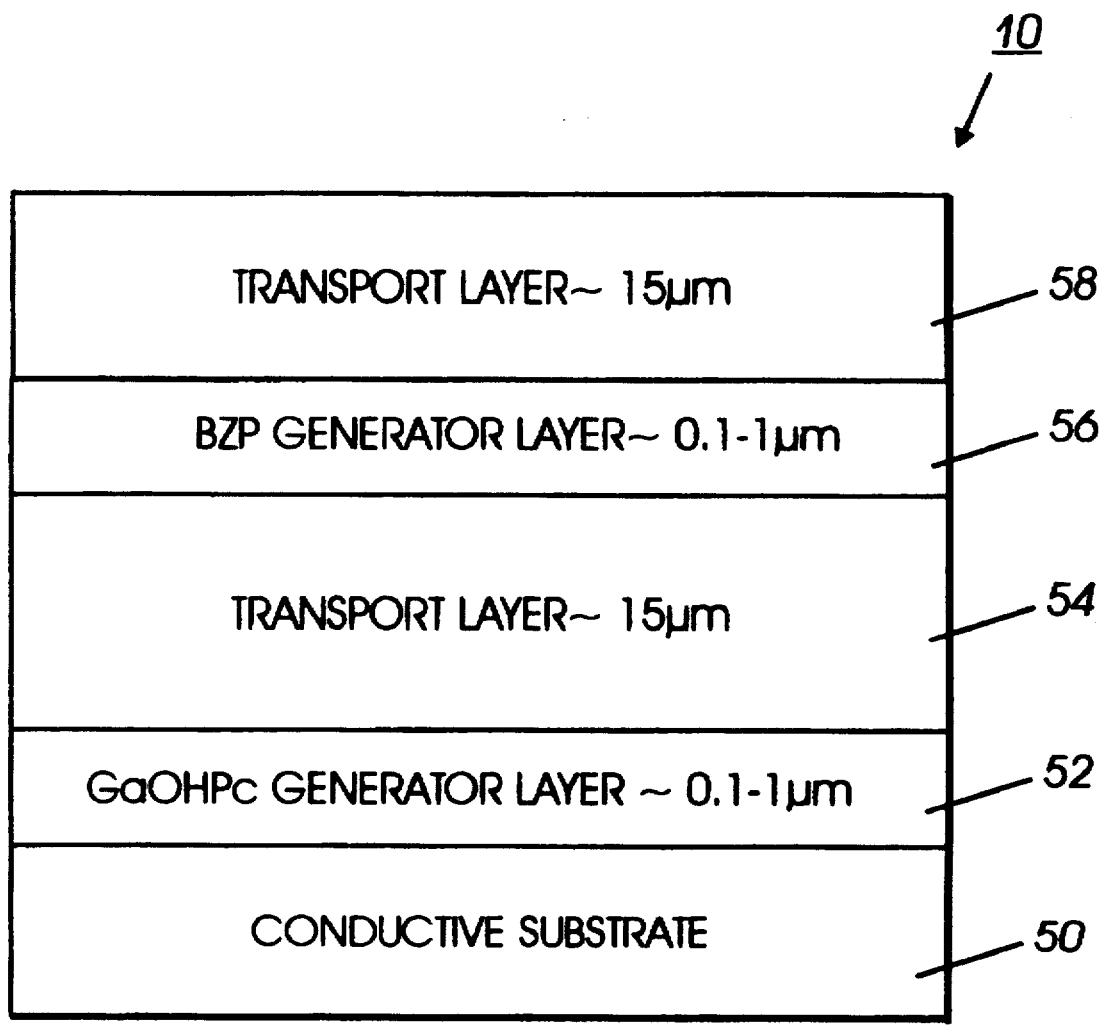
FIG. 1 is a schematic illustration of a dual layer, dual wavelength photoreceptor belt for use in the xerographic printing system of FIG. 8.

As illustrated in FIG. 1 the photoreceptor belt 10 consists of a flexible electrically conductive substrate 50. The substrate can be opaque, translucent, semi-transparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallization on plastic, such as titanized or aluminized Mylar™ polyester, wherein the metalized surface is in contact with the bottom photoreceptor layer or any other layer such as a charge injection blocking or adhesive layer situated between the substrate and the bottom photoreceptor layer. The substrate has any effective thickness, typically from about 6 to about 250 microns, and preferably from about 50 to about 200 microns, although the thickness can be outside of this range. The photoreceptor belt further comprises a pair of photoreceptor structures each including a charge generation layer and a charge transport layer.

Adhered to the substrate 50 is a first or lower generator layer 52 of GaOHPc approximately 0.1 to 1 µm thick, a first or lower transport layer 54 of N,N'-diphenyl-N,N'-bis(3"-methylphenyl)-(1,1'-biphenyl)-4,4'-diamine (TPD) in polycarbonate which is hole transporting and approximately 15 µm thick, a second or upper generator layer 56 of benzimidazole perylene (BZP) approximately 0.1 to 1 µm thick, a second or upper transport layer 58 of TPD in polycarbonate which is hole transporting and approximately 15 µm thick.

The GaOHPc generator layer is thin enough to maintain low dark decay and the BZP generator layer is thick enough to be opaque to the wavelength used to discharge it. BZP is known to be coatable to opaque thicknesses while maintaining low dark decay.

For this illustrative example, the GaOHPc generator layer is infrared sensitive at 830 nm and the BZP generator layer is red sensitive at 670 nm. Each generator layer can only be accessed by one of the two wavelengths. The BZP layer does not absorb the 830 nm wavelength and passes it to the GaOHPc layer. The 670 nm wavelength is absorbed by the BZP layer and is not transmitted to the GaOHPc layer (which would also be sensitive to the 670 nm light).

The generator and transport layers can be deposited by vacuum evaporation or solvent coating upon the substrate by means known to those of ordinary skill in the art.

During exposure of the photoreceptor belt 10 to the light beams from the ROS 24, the 670 nm wavelength of one modulated beam would be entirely absorbed in the opaque BZP generator layer. Exposure with the 670 nm beam would therefore discharge the BZP and upper transport layer 58. None of the 670 nm light beam would reach the GaOHPc layer so that it and the lower transport layer 54 would remain fully charged. The second wavelength is chosen to be 830 nm to insure that it will pass completely through the BZP layer without effecting any discharge of that layer or upper transport layer 58. However, the GaOHPc layer is sensitive to 830 nm and exposure with this wavelength from a modulated beam will discharge that layer and the lower transport layer 54. The 830 nm exposure should not be allowed to effect discharge through the benzimidazole perylene layer and the upper transport layer.

Figure 2:
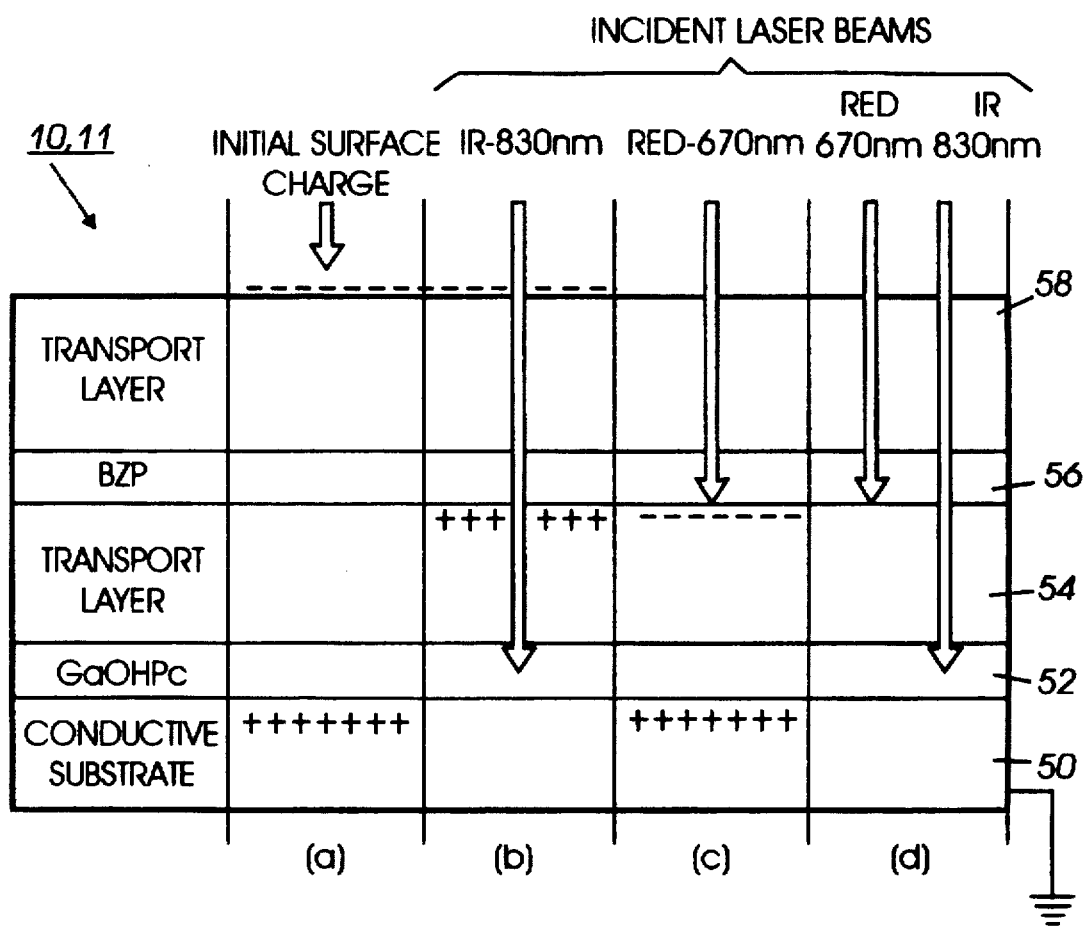
FIG. 2 is a schematic illustration of the state of the photoreceptor following initial exposure thereof.

As illustrated in FIG. 2, exposure of an area of the photoreceptor belt 10 to the both wavelengths or to only one of the wavelengths results in the photoreceptor being electrostatically conditioned as follows: (a) the unexposed areas which retain the original surface voltage, (b) areas exposed with the 830 nm beam which are discharged to roughly one-half of the original surface voltage, (c) areas exposed with the 670 nm beam which are also discharged to roughly one-half of the original photoreceptor voltage, $V_0$ and (d) the areas exposed with both the 830 nm and 670 nm wavelength beams which are fully discharged. While only three voltage levels are present on the photoreceptor immediately following exposure, there will be four distinctly different areas after xerographic development during the first pass of the photoreceptor through the process stations. While the surface voltages in regions (b) and (c) are roughly equal after exposure they have been formed in very distinct ways. During the development process the photoreceptor will remember how these voltages were formed to allow development in very different ways in the two regions.

The image area represented by (a) corresponds to the CAD portion of a tri-level image while the image area represented by (d) corresponds to the DAD portion of a tri-level image. The areas represented by (b) and (c) in FIG. 2 are at a voltage level corresponding to the background level of the tri-level image. Because of the way these images were formed the area (b) represents a second DAD image area which initially is not distinguishable from the background voltage level at (c). At the appropriate point in the imaging process, the second DAD image is rendered distinguishable so that it can be developed.

Figure 3:
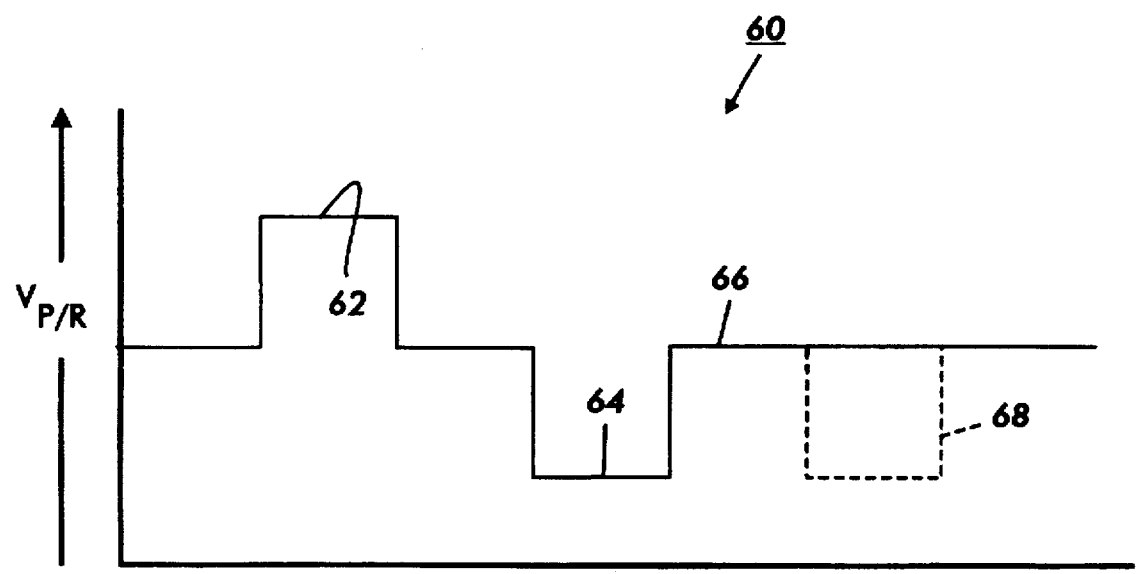
FIG. 3 depicts a xerocolographic, latent, tri-level image profile.

As shown in FIG. 3, the photoreceptor voltage profile of the photoreceptor 10 after exposure is such that it contains a tri-level image 60 comprising a charged image area 62, a discharged image area 64 and a background area 66. The tri-level image also includes initially a virtual image 68 which is at the same voltage level as the background voltage.

As illustrated in FIG. 8, as the negatively charged photoreceptor belt moves past a blue developer housing structure 80 where the CAD image 62 is developed with positively charged blue toner deposited thereon via a donor roll structure 82. While the developer housing structure is illustrated as being a Non Interactive Development (NID) device a magnetic brush development system may also be employed since the CAD image is the first image developed.

As the tri-level image is moved past a green developer housing structure 84 negatively charged green toner is deposited on the DAD image area 64 via an electroded donor roll structure 86. This development station could also employ a soft magnetic brush development system.

The order of the CAD and first DAD development can be reversed since there are no intervening steps in the process.

Following development of the CAD and DAD images, the photoreceptor is uniformly recharged to the background level 66 using a corona discharge device 90 such as a scorotron or dicorotron. The recharge step is followed by flood exposing the entire photoreceptor 10 using an illumination source 92 operating at a suitable wavelength. The effect of this exposure step is to discharge regions of the photoreceptor containing the virtual image 68 thereby forming a second developable DAD image.

The toners used to develop the CAD and first DAD images are opaque to light at the wavelength of the flood exposure in order to avoid developing a voltage offset after the recharge and flood exposure.

The second developable DAD image is developed with red negatively charged toner using an NID device 93 including an electroded donor roll 94.

The photoreceptor 10 is recharged using a corona discharge device 100. This recharge step is followed by an imagewise exposure using an infrared wavelength, e.g. 830 nm, ROS or Light Emitting Diode (LED) array 102. The device 102 imagewise exposes a portion of the white (undeveloped) background area 66 of the photoreceptor. The image formed in this manner is subsequently developed using a DAD developer system 104 including an electroded donor roll 105 which deposits negatively charged black toner on the image.

Each of the components of the imaging apparatus are selectively actuatable though the control the an Electronic SubSystem (ESS) 23 and a User Interface (UI) 106. Thus, pursuant to the invention and in addition to being able to develop perfectly registered RGB images together with black images as discussed above, K+2 colors can also be achieved. One way for K+2 colors to be accomplished, is for the red developer device 93, recharge device 100 and imagewise exposure device 102 to be rendered inoperative in response to a program selected by an operator using the UI 106. In this case the colors as well as the black are perfectly registered because the images are all written simultaneously with the same ROS at the same imaging station. All other K+2 combinations require recharge 100 and exposure 102 be operative. In these cases only the colors are perfectly registered.

In another mode of operation, a narrower color gamut imaging with perfectly registered RGB images is also possible. For this purpose the recharge device 100, imagewise exposure device 102 and the black developer unit 104 are rendered inoperative.

Figure 4:
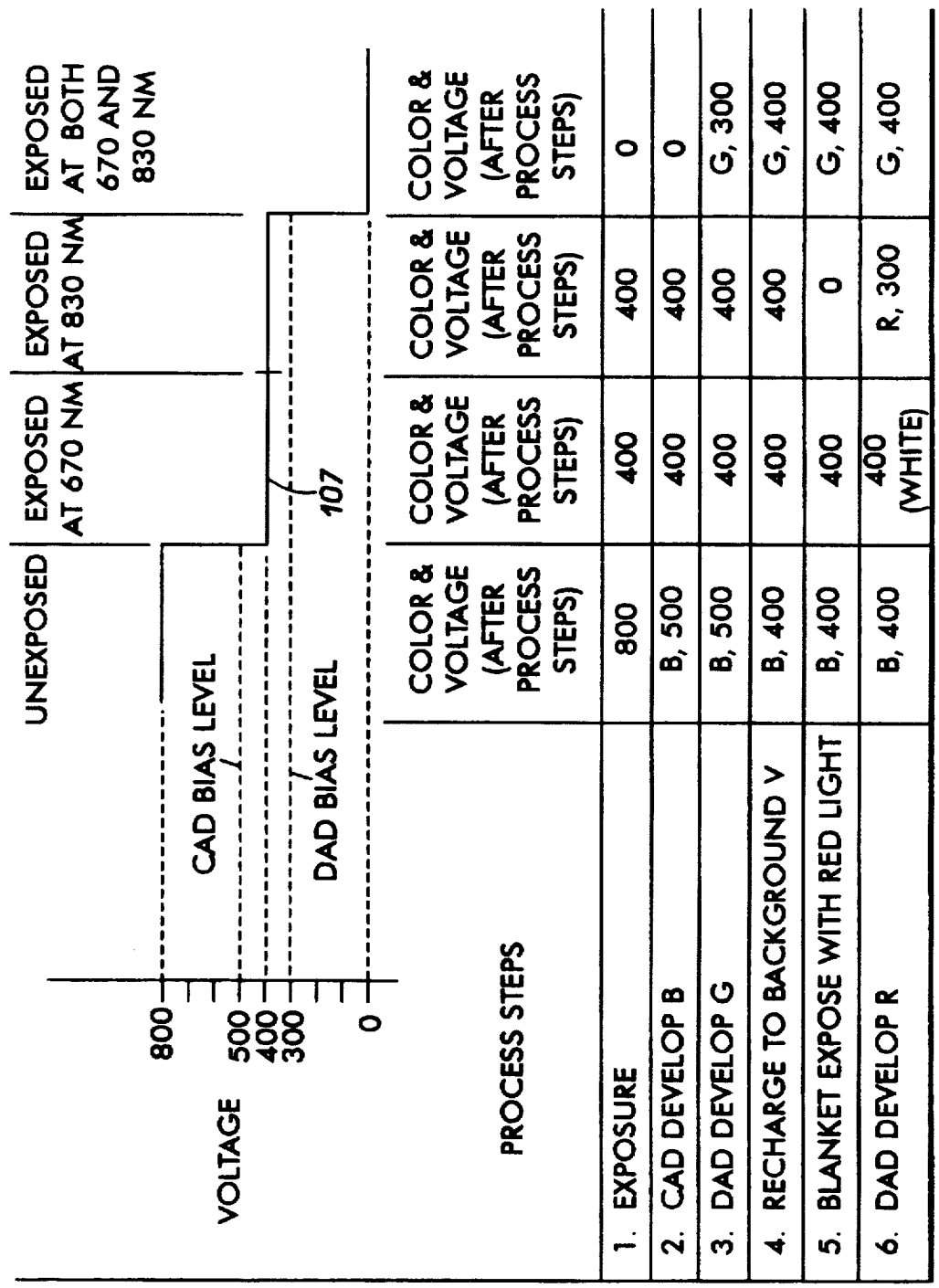
FIG. 4 depicts color development steps using a two color or two layer photoreceptor and RGB pigments.

The electrostatics involved using RGB toners are depicted in FIG. 4. As shown therein, a tri-level image 107 is formed as the result of the imagewise exposure, step 1. Normally a photoreceptor is discharged to a small but non zero potential. For simplicity this residual voltage after full exposure is taken to be zero volts in FIG. 4. Furthermore it is assumed in FIG. 4 that the charge on the developed toner brings the image potential to the same level as the development bias. Step 2 involves developing the CAD image using blue toner where the blue developer structure is electrically biased at about 100 volts offset from the background voltage effecting deposition of positively charged blue toner on the CAD image. The rows of the table of FIG. 4 show the charge level of the CAD, DAD and background areas of the photoreceptor at any given step in the process as well as the color toner developed on a given image area. Step 3 of the process effects development of the DAD image with green toner with the green developer housing bias being the offset from the background by about 100 volts in the opposite direction from the bias for the blue housing. Following development of the CAD and DAD images, the photoreceptor is recharged to mid level (step 4) and flood illuminated (step 5) in order to form the second DAD image at 0 volts (ideal situation). The DAD image created by the flood illumination step is then developed with negatively charged red toner, step 6. The bias for this development step is offset by about 100 volts from the midlevel which is the same as the offset used for the other DAD housing.

The electrostatics involved using RGBK toners are depicted in FIG. 5. The process steps for RGBK are identical to steps 1 through 6 for the RGB process illustrated in FIG. 4. For RGBK, steps 7, 8 and 9 are added. In step 7 the photoreceptor is uniformly charged to $V_0/2$ (assumed here to be 400 V). Step 8 shows the imagewise exposure with infrared light, e.g. 830 nm, of a portion of the nondeveloped background area which creates a DAD image at residual potential, taken to be 0 volts in this case. Step 9 provides for development of the image created using the imagewise exposure device 102 as shown in FIG. 8. This third DAD development is done with black toner with the black developer housing bias being set at about 100 volts offset from the mid level.

Because the composite image developed on the photoreceptor consists of both positive and negative toner, a pretransfer corona discharge member 112 disposed at pretransfer charging station J is provided to condition the toner for effective transfer to a substrate using positive corona discharge. The pretransfer corona discharge member is preferably an AC corona device biased with a DC voltage to operate in a field sensitive mode and to perform tri-level xerography pretransfer charging in a way that selectively adds more charge (or at least comparable charge) to the part of composite tri-level image that must have its polarity reversed compared to elsewhere. This charge discrimination can be enhanced by discharging the photoreceptor carrying the composite developed latent image with light (not shown) before the pretransfer charging begins. Furthermore, flooding the photoreceptor with light coincident with the pretransfer charging minimizes the tendency to overcharge portions of the image which are already at the correct polarity.

Figure 6A:
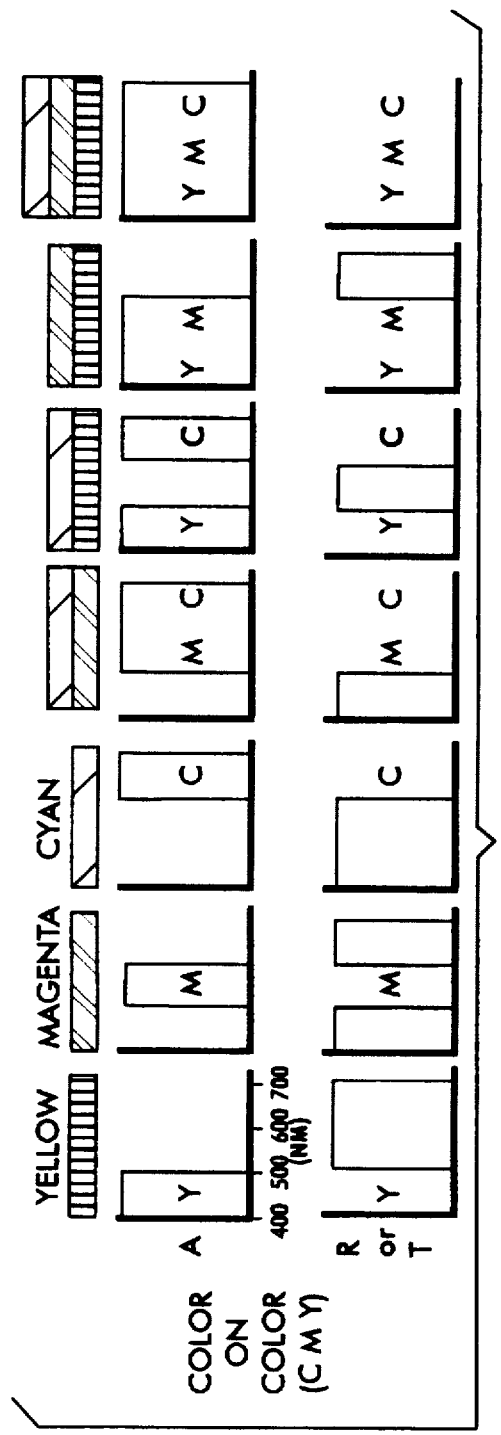
FIGS. 6A and 6B shows a comparison of the color gamuts which can be achieved with the RGB and CMY color schemes.
Figure 6B:
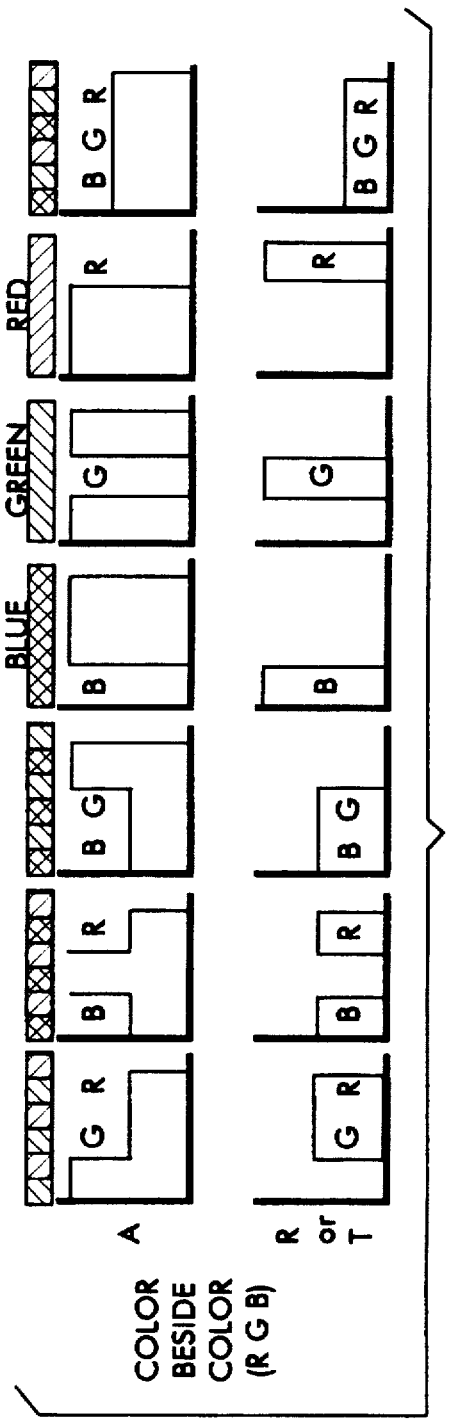

The colors achievable with RGB additive colors compared to those achievable with CMY subtractive colors are shown in FIGS. 6A and 6B. In these figures the vertical axes are designated as A for absorption, R for reflection and T for transmission of light. The horizontal axes show the wavelength of light and its division into spectral components. In general, the CMY colors are not saturated in the RGB scheme. For example, the reflection of G and R light from Y toner on paper is very high in the color-on-color CMY scheme. The equivalent reflection of G and R light from the color-beside-color RGB scheme is only about half the value since the R toner creates unwanted G absorption and the G toner creates unwanted R absorption. In the color-beside-color RGB scheme, the CMY colors are not saturated but the RGB colors are saturated. In the color-on-color CMY scheme the CMY colors are saturated but the RGB colors are not fully saturated due to the nature of the color pigment absorptions.

Figure 7:
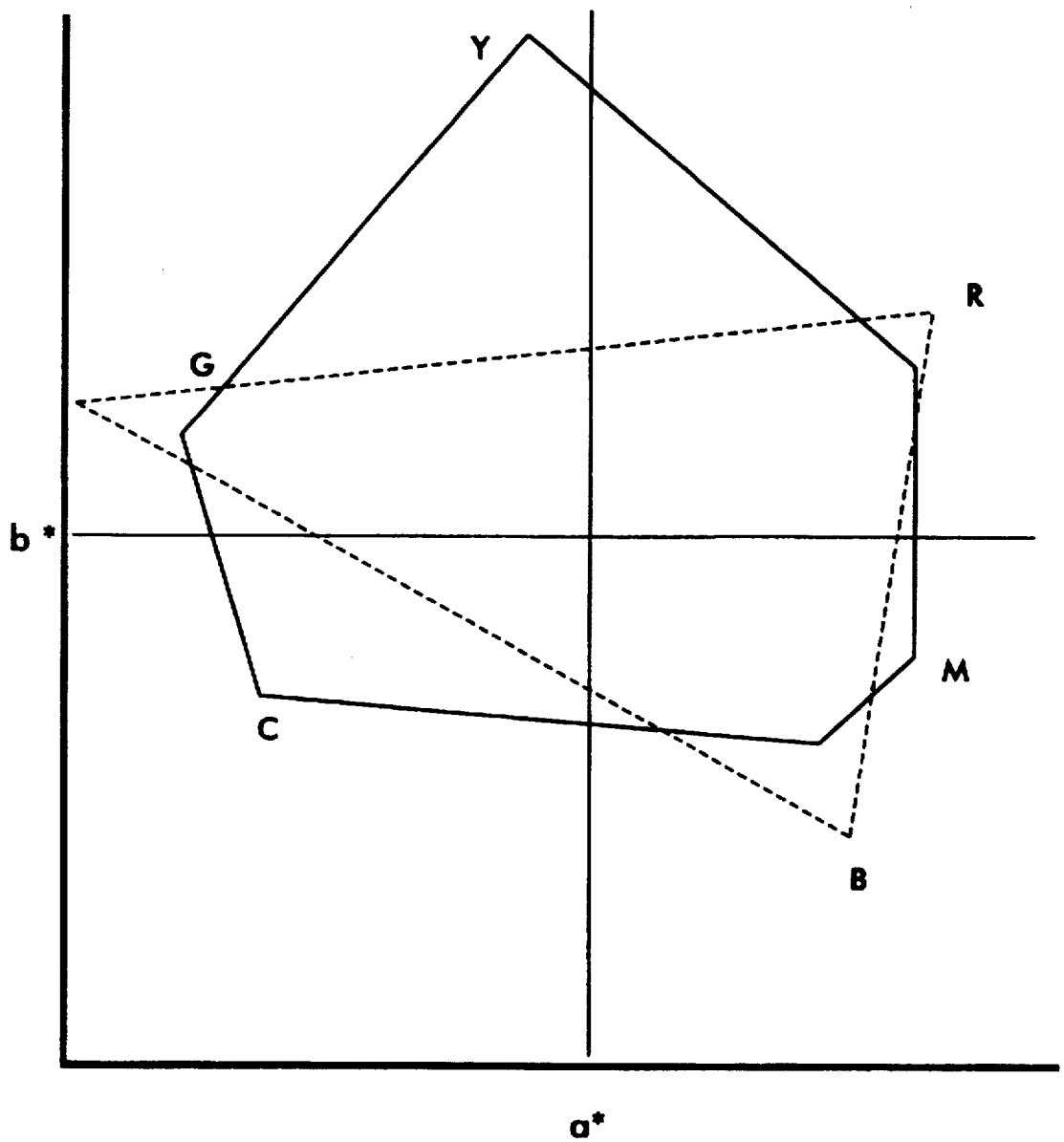
FIG. 7 shows the colors achievable with RGB additive colors compared to those achievable with CMY subtractive colors.

In FIG. 7 a comparison of the color gamuts which can be achieved with the two schemes is shown in the a*b* plane of the CIELab color coordinate system. The total gamut of the CMY scheme is generally better overall but lacks the saturation of the RGB colors obtainable with the RGB pigments themselves. The saturation of the CMY colors is of course better in the subtractive scheme because of the presence of the CMY pigments themselves. However, the color-beside-color RGB scheme still gives a good color gamut which is similar to that of a CRT and is adequate for many applications.

As shown in FIG. 7, the color gamut which can be achieved with the color on color (CMY) scheme is the area enclosed by the solid line. The color gamut which can be achieved with the color beside color (RGB) scheme is the area enclosed by the dashed line. In the example, the RGB colors in the additive scheme will generally have greater saturation than in the subtractive scheme due to the nature of the RGB color pigments. The color on color CMY pigments do not generally give as saturated RGB colors as the RGB pigments themselves.

The images created using the green, blue, red and black toners, as shown in FIG. 8, are transferred to a final substrate 114, such transfer taking place at transfer station K.

Transfer station K includes a corona generating device 116 which sprays ions of a suitable polarity onto the backside of substrate 114. This attracts the charged toner powder images from the photoreceptor belt 10 to the substrate.

After the images have been transferred to the substrate 114 from photoconductive surface of belt 10, the residual toner particles carried by the photoconductive surface are removed therefrom. These particles are removed at cleaning station L. A magnetic brush cleaner housing is disposed at the cleaner station L. The cleaner apparatus comprises a conventional magnetic brush roll structure 118 for causing carrier particles in the cleaner housing to form a brush-like orientation relative to the roll structure and the charge retentive surface. It may also include a pair of detoning rolls (not shown) for removing the residual toner from the brush. Other cleaning systems, such as fur brush or blade, are also suitable.

Subsequent to cleaning, a discharge lamp 113 positioned at station M floods the photoconductive surface with white light to dissipate any residual electrostatic charge remaining prior to the charging thereof for the successive imaging cycle.

Fusing station N includes a fuser assembly, indicated generally by the reference numeral 134, which permanently affixes the transferred powder image to substrate 114. Preferably, fuser assembly 134 comprises a heated fuser roller 136 and a backup roller 138. Substrate 114 passes between fuser roller 136 and backup roller 138 with the toner powder images contacting fuser roller 136. In this manner, the toner powder image is permanently affixed to substrate 114. After fusing, a chute, not shown, guides the advancing substrate 114 to a catch tray, also not shown, for subsequent removal from the printing machine by the operator.

We claim:

1. A method of creating color images during a single pass in a xerographic printing system using a single exposure, dual wavelength imaging device and a multilayered charge retentive structure, said method including the steps of;

uniformly charging said charge retentive structure to a predetermined voltage level;

using said single exposure, dual wavelength imaging device, forming spot next to spot CAD and DAD images, a virtual DAD image which is not immediately developable and background areas, said CAD and DAD images being at different voltage levels from said each other and from the voltage level of said background areas and said virtual DAD image being at the same level as the voltage level of said background areas;

developing said CAD and DAD images with imaging materials each containing one pigment of two of the additive primary colors;

conditioning said charge retentive structure to convert said virtual image to another developable DAD image by flood illuminating said charge retentive structure with light having a predetermined wavelength;

developing said another developable DAD image with imaging materials containing pigment different from said two primary additive colors;

conditioning a portion of said background area for forming still another DAD image by uniformly charging the charge retentive structure to about the same voltage level as said background areas;

using a second image forming device to form said still another DAD image in a portion of the undeveloped background area; and developing said still another DAD image with another imaging material different from the first three imaging materials.

2. A method of creating color images during a single pass in a xerographic printing system using additive RGB plus black color imaging materials, the method comprising the steps of:

(a) providing a multilayered photoreceptor comprising a pair of photoreceptor structures, each structure comprising a charge generation layer and a charge transport layer, each structure responsive to a different light beam wavelength;

(b) providing a single exposure, dual wavelength imaging device capable of emitting two different light beams, each light beam having a wavelength for which one of the photoreceptor structures is responsive;

(c) uniformly charging the photoreceptor to a first predetermined voltage level;

(d) using the dual wavelength imaging device to expose the charged photoreceptor and form spot next to spot CAD and DAD images, a virtual DAD image which is not immediately developable, and background areas, said CAD and DAD images being at different voltage levels from each other and different from the voltage level if said background areas, said virtual DAD image being at the same voltage level as said background areas;

(e) developing said CAD and DAD images with two of the three RGB imaging materials;

(f) flood exposing the photoreceptor which an illumination source emitting light having a wavelength which will reduce the voltage level of the virtual DAD image to a voltage level which will enable development by the remaining one of RGB imaging materials;

(g) developing the virtual image with the remaining one of the RGB imaging materials;

(h) uniformly recharging the photoreceptor to a second predetermined voltage level equal to the voltage level of the background areas;

(i) imagewise exposing the background areas of the photoreceptor with a second imaging device to form another DAD image; and (j) developing said another DAD image with black imaging material to complete a composite image of RGB. plus black imaging materials on the photoreceptor.

3. The method of creating color images as claimed in claim 2, wherein the first predetermined voltage is $V_0$, wherein the second predetermined voltage is $V_0/2$; and wherein the photoreceptor is a belt and said photoreceptor structures are formed on a conductive support, so that one of the structures is sandwiched between and in contact with the conductive substrate and the other of said structures.

4. The method of creating color images as claimed in claim 3, wherein the dual wave length imaging device is dual wavelength emitting laser which emits one light beam having red light wavelength of about 670 nm and a second light beam having an infrared light wavelength of about 830 nm; and wherein the photoreceptor structure contacting the conductive substrate is responsive to infrared light and the other of the two photoreceptor structures is responsive to red light.

5. The method of creating color images as claimed in claim 4, wherein said second imaging device is a light beam emitting device which emits light beams having infrared wavelengths of about 830 nm.

6. The method of creating color images as claimed in claim 5, wherein the method further comprises: after step (e), recharging the photoreceptor to the background voltage level.

7. The method of creating color images as claimed in claim 5, wherein the imaging material used to develop the CAD image is a positive blue toner; wherein the imaging material used to develop the DAD image immediately after the CAD image development is negative green toner; and wherein the imaging material for the virtual DAD image is negative red toner.

8. The method of creating color images as claimed in claim 5, wherein the method further comprises:

using a pretransfer corona discharge member to condition the composite image composed of RGB plus black imaging materials for transfer to a final substrate;

transferring the composite image to a final substrate;

(m) fusing the composite image to the final substrate by a fuser assembly to affix the composite image permanently to the final substrate; and n) advancing the final substrate with the permanently affixed composite image to a catch tray for removal therefrom by an operator.

* * * * *